United States Patent Office 3,078,301
Patented Feb. 19, 1963

3,078,301
ESTERS OF N-CARBOALKOXY-E-AMINO-
CAPROIC ACID
Bernard Taub, Williamsville, N.Y., assignor to Allied
Chemical Corporation, New York, N.Y., a corporation
of New York
No Drawing. Filed Oct. 31, 1960, Ser. No. 65,890
10 Claims. (Cl. 260—482)

This invention relates to novel esters of N-carboalkoxy-E-aminocaproic acid, and to a process for the preparation of such esters. It also relates to polyvinyl resin compositions containing one or more esters of N-carboalkoxy-E-aminocaproic acids as plasticizers therefor.

It has been shown in the past that N-carboalkoxy-E-aminocaproic acid esters can be prepared in various ways. The two lower esters, methyl carbomethoxy-E-aminocaproate and ethyl carboethoxy-E-aminocaproate, are known in the art. The dimethyl ester was prepared by subjecting pimelic acid monoethylesteramide to a Hoffman reaction in anhydrous methanol (Chem. Ber., 89, 120 (1956)), and the diethyl compound has been prepared from the ethyl ester of E-aminocaproic acid hydrochloride (J. Chem. Soc., 186 (1939)). The former procedure involves the use of difficultly obtainable esteramides of dicarboxylic acids while by the latter procedure the yields obtained leave much to be desired.

By the novel method of this investigation, an N-carboalkoxy-E-aminocaproic acid is heated with a small excess (on an equimolar basis) of an alcohol or a mixture of alcohols in the presence of an esterification catalyst (such as p-toluenesulfonic acid, sulfuric acid, hydrochloric acid or boron trifluoride). Preferably, the reaction is carried out in the presence of a water-immiscible solvent (particularly a substituted or unsubstituted aliphatic, alicyclic or aromatic hydrocarbon), such as toluene, and the reaction mixture is distilled to remove water formed by the esterification reaction. The esters so formed can be isolated in pure form by distillation under reduced pressure.

Various N-carboalkoxy-E-aminocaproic acids can be employed for the production of the esters. Many of them are themselves new compounds which have not been prepared or described heretofore. I have found that they can be conveniently and economically prepared by first treating caprolactam with aqueous alkali, and then reacting the resultant aminocaproic acid salt, preferably in the same reaction medium in which it was formed, with a haloformate of the appropriate alcohol.

The reaction scheme involved in this novel synthesis is indicated by the following sequence.

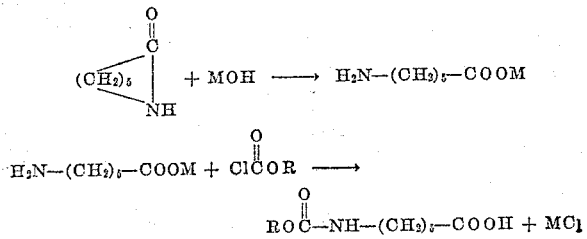

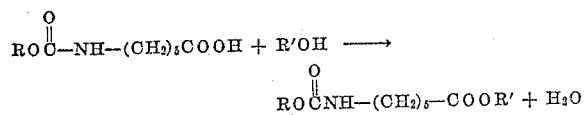

wherein R and R' are each selected from the group consisting of alkyl, cycloalkyl and aralkyl, and M represents either one of the alkali or alkaline earth metals.

In accordance with a preferred mode of carrying out this process, E-caprolactam is heated in an aqueous sodium hydroxide solution, preferably at reflux temperature, for about 2 hours to produce sodium-E-aminocaproate in solution. This solution is cooled to below 20° C., and to it is cautiously added an n-alkylchloroformate at such a rate that the temperature of the mixture does not exceed about 25° C. The mass is agitated for about 16 hours without further temperature control and is then acidified. A precipitate of the N-carboalkoxy-E-aminocaproic acid is thus obtained in high yield. For the production of the ester, the acid is then esterified in the manner set out above.

I have found that the esters of the present invention can be prepared more readily and can be obtained in higher yield by this process than by the above prior procedures. Further, the reactants required are readily obtainable and are relatively economical.

Prior to the present invention, the compounds that have found the greatest application as plasticizers for polyvinyl resins have been diesters of dicarboxylic acids, such as dibutyl phthalate, dioctyl phthalate and dioctyl succinate. Although such diesters result in acceptable working viscosities and flexible polymerized products, they have the objectionable tendency to bleed (that is, gradually to evaporate from the finished product) with the result that polyvinyl resin products which are originally clear and flexible, become hazy and brittle after a relatively short period of use. Furthermore, the amount of such plasticizers required to impart the desired degree of fluidity and flexibility is so great that other physical properties, such as tensile strength and the like are often reduced to an undesirable extent.

I have discovered that N-carboalkoxy-E-aminocaproic acid esters containing 12 or more carbon atoms constitute a class of compounds which have a surprising combination of advantageous properties which renders them highly effective as plasticizers for polyvinyl resins. The polyvinyl resin compositions produced by this class of esters are characterized by their excellent plastic stability, and by the ease with which the compositions are worked at the process temperatures without requiring the use of such large amounts of them that other properties of the composition are harmfully affected.

Esters of N-carboalkoxy-E-aminocaproic acid which contain 20 or more carbon atoms are in general difficult to incorporate into the polyvinyl resin formulations. These high molecular weight esters produce resinous compositions which have less advantageous viscosity characteristics than the esters of lower molecular weight. In the alkyl-N-carboalkoxy-E-aminocaproates for instance, there is an increasing lack of clarity in the plasticized resin composition with an increase in total carbon content above 19 atoms.

Consequently, those N-carboalkoxy-E-aminocaproic acid esters which contain a total of 12 to 19 carbon atoms in the molecule are preferred for use as plasticizers for polyvinyl resins.

Certain of these esters are more efficient plasticizers for one polyvinyl resin than for another. But since readily performed standard tests have heretofore been developed for the evaluation of plasticizers for the various polyvinyl resins, the selection of the particular ester most effective for imparting the desired properties to a particular resin can be accomplished in a routine manner.

The N-carboalkoxy-E-aminocaproic acid esters employed in accordance with the present invention can be incorporated with the polyvinyl resins, or compositions containing them, in any suitable manner, including those which have been employed for the incorporation of known plasticizers. For example, they can be mixed with the polyvinyl resin and the mixture, with or without the addition of other usual substances (such as, dispersions of pigments, fillers and/or other ingredients), can be blended by passing it between pairs of heated rolls operating at differential speeds, such as in a Banbury mixer.

In view of the general compatibility of said esters with polyvinyl resins, especially at the temperatures at which the resin formulations are compounded, they can be readily blended with said resins. The relatively high boiling points of said esters are also an advantage in their use as plasticizers, since during the compounding of the resin mix the ingredients are often subjected to considerable heat in order to obtain plasticization as well as dispersion of other ingredients. Further, due to the low vapor pressure of the esters, little if any loss is encountered and the usual fume problem, with resultant health and safety hazards to personnel and equipment, is avoided.

The amount of N-carboalkoxy-E-aminocaproic acid ester employed as plasticizer can vary widely but in general, an amount equal to about 20% to about 60% of the weight of the polyvinyl resin in the resin formulation is used to secure the full benefit of the properties of the esters of said class.

As illustrative embodiments of the preparation of the N-carboalkoxy-E-aminocaproic esters, the following examples are given. The parts are by weight and the temperatures are in degrees centigrade.

EXAMPLE A

A mixture of 56.5 parts of E-caprolactam and 40 parts of caustic soda in 300 parts of water was boiled under reflux for 2 hours. The resultant soluton was cooled to 20° and 61.3 parts of n-propylchloroformate were added in one hour while cooling to maintain the temperature of the mixture below 25°. Thereafter, the mass was agitated for about 16 hours with no further cooling. The mixture was then cooled to about 10° and rendered acid by the addition of aqueous hydrochloric acid. The resultant precipitate was filtered off, washed with water, and then dried in a vacuum oven maintained at ambient temperature. The dried product, N-carbopropoxy-E-aminocaproic acid, melting at 57–58°, was obtained in a yield of 96 parts (88% of theoretical yield).

EXAMPLES B THROUGH E

The following additional N-carboalkoxy derivatives of E-aminocaproic acid were similarly prepared by the process of above Example A, using equivalent molar amounts of the alkylchloroformates set out in Table I below.

*Table I*

| Example | Alkylchloroformate | Percent Yield | M.P., degrees |
|---|---|---|---|
| B | Ethyl | 77 | |
| C | n-Butyl | 97 | 51–52 |
| D | Amyl | 92 | 43–44 |
| E | Hexyl | 95 | 49–50 |

The N-carbocyclohexoxy, the N-carbobenzoxy, and the N-carbo-2-ethylhexoxy-E-aminocaproic acids can be prepared in a similar manner.

EXAMPLE F

A mixture consisting of 51 parts of N-carboethoxy-E-aminocaproic acid, prepared as described in Example B above, 130 parts of octanol (2-ethylhexanol), 200 parts of toluene, and 1 part of p-toluenesulfonic acid was boiled for 18 hours under a reflux condenser equipped with a Dean-Stark water trap for removal of water and return of the toluene to the boiling mixture. The resulting solution was clarified by filtration and then washed, first with five 50-part portions of 5% aqueous sodium carbonate, and then with three 100-part portions of water. The washed mass was distilled, first at atmospheric pressure to remove toluene, and then under reduced pressure to remove excess octanol. The residue was distilled in vacuo, and the fraction boiling at 172–176° at 2 mm. pressure was collected separately. It consisted of 69 parts (87% of the theoretical yield) of octyl-N-carboethoxy-E-aminocaproate having the formula—

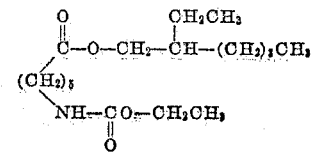

EXAMPLES G TO P

The following additional esters, having the constitutions and boiling ranges of the pressures set out in Table II below, are prepared in a similar manner to that given in Example F, employing the corresponding amounts of other N-carboalkoxy-E-aminocaproic acids and/or alcohols. In the table, R is the alkyl group of the esterifying alcohol, and R' is the alkyl group forming part of the N-carboalkoxy radical.

*Table II*

| Example No. | Ester | | Percent yield | Boiling range |
|---|---|---|---|---|
| | R | R' | | |
| G | Butyl | Ethyl | 94 | 152–155°/2 mm. |
| H | do | Propyl | | 182–183°/3 mm. |
| I | do | Butyl | 84 | 200–202°/4 mm. |
| J | do | Amyl | 72 | 181–184°/2 mm. |
| K | do | Hexyl | 69 | 201–204°/3 mm. |
| L | Octyl | Propyl | | 218–219°/4 mm. |
| M | do | Butyl | 74 | 204–207°/2 mm. |
| N | do | Amyl | 70 | 228–230°/5 mm. |
| O | do | Hexyl | 70 | 208–210°/2 mm. |
| P | 2-Ethylhexyl | 2-Ethylhexyl | 88 | 214–217°/2.5 mm. |

Alkyl N-carboalkoxy-E-aminocaproates in which R and R' are cyclohexyl and benzyl can be prepared in a similar manner.

The invention will be further illustrated by the following specific examples which demonstrate the beneficial effects of the alkyl esters of N-carboalkoxy-E-aminocaproic acids in Examples G through P when admixed in plasticizing amount with a polyvinyl resin. The temperatures are in degrees centigrade and the parts and percentages are by weight.

EXAMPLES 1 TO 9

The ester plasticizer was compounded with a commercially available polyvinly chloride resin, Geon 101 (Goodrich) in proportion of 1 part of the plasticizer and 2 parts of the resin. The mixture was blended, on a two roller mill heated to about 140°, for about 15 minutes. A 4" x 4" square of the resulting mass was calendered in a heated Carver press and the resulting film was subjected to a number of conventional tests to determine its physical properties. The tests are among those generally accepted as providing a measure of the plasticizing ability of a plasticizer. The data thus obtained were compared with similar data obtained from the same polyvinyl chloride resin plasticized in the same manner with identical amounts of commonly used commercially available plasticizers: di-2-ethylhexylphthalate and diethyladipate. The results of these tests are given in the following Table III wherein R and R' have the same meaning as in Table II.

Table III

| Example No. | Alkyl ester of N-carboalkoxy-E-aminocaproic acid | | Tensile strength,[1] p.s.i. | Elongation at break, percent | Original physical appearance |
|---|---|---|---|---|---|
| | R | R' | | | |
| 1 | Butyl | Ethyl | 2,796 | 555 | Clear. |
| 2 | do | Butyl | 2,253 | 440 | Do. |
| 3 | do | Amyl | 2,570 | 356 | Do. |
| 4 | Octyl | Ethyl | 2,404 | 403 | Do. |
| 5 | Butyl | Hexyl | 2,526 | 366 | Do. |
| 6 | Octyl | Butyl | 2,220 | 296 | Translucent. |
| 7 | do | Amyl | 2,096 | 256 | Do. |
| 8 | do | Hexyl | 1,950 | 156 | Do. |
| 9 | 2-Ethyl-hexyl | 2-Ethyl-hexyl | 2,450 | 315 | Clear. |
| | Ethyl | Ethyl | 2,520 | 580 | Clear. |
| | Di-2-ethylhexyl phthalate | | 1,525 | 240 | Translucent. |
| | Diethyladipate | | 2,798 | 575 | Clear. |

[1] ASTM Test D-638.

The test films containing the said plasticizers were stored in a closed cabinet for 6 months and reexamined for clarity. After 6 months, the film containing ethyl N-carboethoxy-E-aminocaproate which was originally clear, was hazy and mottled, indicating that the plasticizer had migrated and hence the resinous composition was not stable. None of the compositions of Examples 1 to 9 showed any deterioration in clarity. In contrast thereto, the composition containing diethyladipate showed an extreme amount of migration in 16 hours; the film became cloudy and a white haze formed, whereas the films of Examples 1 to 9 were still clear.

From these data it can readily be seen that the esters employed in accordance with the present invention give rise to strong, flexible and clear plastic compositions, which are more stable than similar compositions containing well-known plasticizers heretofore commonly used.

Although the examples have dealt with polyvinyl chloride and certain specific esters of N-carboalkoxy derivatives of E-aminocaproic acid, comparable results can be obtained with other polyvinyl resins, (for instance polystyrene, polyvinyl acetate, polyvinyl alcohol, polyvinyl carbazole, and polyvinylidene chloride) and with various mixtures (copolymers) of these resins, and with esters other than those disclosed herein.

Various other ingredients commonly employed in preparing resinous compositions, such as pigments, fillers, modifying resins, foaming agents, polymerization catalysts, solvents, mold lubricants, ultraviolet absorbers and the like, can be included in the resin formulations; further the formulation, curing and treatment of the compositions are carried out in the manner well known to those skilled in the polymer art.

My invention has been described and illustrated in connection with several specific embodiments thereof. While they include the preferred procedures, it should be noted that variations of these procedures are possible. Hence, it will be evident that the invention is not limited to the details of the foregoing illustrative examples and that changes can be made without departing from the scope of the invention.

I claim:
1. A process for the preparation of an N-carboalkoxy-E-aminocaproic acid ester from E-caprolactam which comprises the steps of heating said E-caprolactam with aqueous alkali to form a salt of E-aminocaproic acid, treating said salt with a haloformic acid ester, and esterifying the resultant urethane of E-aminocaproic acid with an alcohol.

2. The process as claimed in claim 1, wherein the haloformic acid ester has the formula $$X-\overset{O}{\underset{\|}{C}}-O-R$$

in which X is a halogen of the group consisting of chlorine and bromine, and R is a member selected from the group consisting of alkyl, cycloalkyl and aralkyl.

3. The process as claimed in claim 1, wherein the esterifying alcohol is a monohydric alcohol which has the formula $$ROH$$

in which R is a member selected from the group consisting of alkyl, cycloalkyl and aralkyl.

4. The process as claimed in claim 1, wherein the alkali is a member of the group consisting of alkali and alkaline earth hydroxides.

5. The process as claimed in claim 1, wherein the esterification is catalyzed with an acid free from a carboxyl group.

6. The process as claimed in claim 1, wherein the esterification is carried out in the presence of a water-immiscible aliphatic, alicyclic, or aromatic hydrocarbon solvent.

7. An ester of N-carboalkoxy-E-aminocaproic acid of the general formula $$R'O-\overset{O}{\underset{\|}{C}}-NH-CH_2-(CH_2)_4-\overset{O}{\underset{\|}{C}}-OR$$

wherein R and R' are members selected from the group consisting of alkyl, cycloalkyl and aralkyl, and R and R' together contain at least 5 carbon atoms.

8. An ester according to claim 7, wherein R and R' are alkyl groups and together contain no more than 12 carbon atoms.

9. An ester according to claim 7, wherein R and R' are members selected from the group consisting of alkyl, cycloalkyl and aralkyl, and R and R' together contain at least 5, but not more than 12 carbon atoms.

10. A mixed ester according to claim 7, wherein R and R' are members selected from the group consisting of alkyl, cycloalkyl and aralkyl, and R and R' together contain at least 5, but not more than 16 carbon atoms.

References Cited in the file of this patent

UNITED STATES PATENTS

| 2,317,378 | Harris | Apr. 27, 1943 |
| 2,777,873 | Hasek | Jan. 15, 1957 |
| 2,807,598 | Hoelscher | Sept. 24, 1957 |
| 2,828,274 | Shen Lo | Mar. 25, 1958 |
| 2,871,259 | Levy | Jan. 27, 1959 |
| 2,917,502 | Schwyzer et al. | Dec. 15, 1959 |